United States Patent Office 3,705,892
Patented Dec. 12, 1972

3,705,892
REARRANGEMENT OF PENICILLIN

Robin D. G. Cooper, Indianapolis, Ind., assignor to Eli Lilly and Company, Indianapolis, Ind.
No Drawing. Continuation-in-part of application Ser. No. 832,836, June 12, 1969. This application Sept. 14, 1970, Ser. No. 72,213
Int. Cl. C07d 91/14
U.S. Cl. 260—239.1
22 Claims

ABSTRACT OF THE DISCLOSURE

Treatment of a penicillin sulfoxide with a triphenyl phosphine or trialkyl phosphite results in rearrangement to a thiazoline azetidinone. This rearrangement product can then be converted to a cephalosporin or to a different penicillin.

CROSS-REFERENCE

This application is a continuation-in-part of my copending application Ser. No. 832,836, filed June 12, 1969.

BACKGROUND OF THE INVENTION

The penicillins and cephalosporins are well-known families of antibiotics, both of which are widely used in the treatment of disease. Members of both families can be obtained by fermentation processes; however, there is a continuing search for ways to chemically modify existing members of the families and for synthetic or semi-synthetic routes to new and known compounds.

One such semi-synthetic route to cephalosporins in that described in Morin and Jackson U.S. Pat. 3,275,626. By means of the process there described a penicillin sulfoxide is rearranged to a cephalosporin. Cephalosporins obtained by this process have a methyl group attached to the 3-position of the ring and are valuable antibiotics.

SUMMARY

I have now discovered another method for the rearrangement of a penicillin sulfoxide, this time to a thiazoline azetidinone, by treatment with at least one equivalent of triphenyl phosphine or a trialkyl phosphite at a temperature within the range of 40° to 125° C. Upon treatment with a peracid and a carboxylic acid this rearrangement product is converted to a mixture of a desacetoxycephalosporin sulfoxide and a hydroxymethylpenicillin sulfoxide.

DESCRIPTION OF THE PREFERRED EMBODIMENT

In accordance with my process a penicillin sulfoxide is treated with triphenyl phosphine or a trialkyl phosphite at a temperature within the range of 40° to 125° C. and preferably within the range of 50° to 110° C. The trialkyl phosphite employed in the process is one in which each alkyl group contains from one to four carbon atoms. Such lower alkyl phosphites are preferred because they are easy to separate from the product. The phosphites themselves are volatile compounds while the phosphates formed in the reaction are water soluble. Examples of suitable lower alkyl phosphites include trimethyl phosphite, triethyl phosphite, tri-n-propyl phosphite and tri-n-butyl phosphite. The preferred phosphites are trimethyl and triethyl phosphite.

The penicillin sulfoxide starting material may be prepared by any convenient method for preparing penicillin sulfoxides such as the process described in U.S. Pat. 3,197,466. The carboxyl group of the penicillin sulfoxide starting material is preferably esterified to protect this group during the rearrangement reaction. Penicillin esters are well known to those skilled in the art. The preferred ester groups are those that may be easily removed to regenerate the free acid. Typical of such groups are the t-butyl, benzyl, methoxybenzyl, nitrobenzyl, benzhydryl, trichloroethyl and phenacyl groups.

Thus, suitable penicillin sulfoxides for my process are those having the formula $$R-\overset{O}{\overset{\|}{C}}-NH-CH-CH\overset{\overset{O}{\uparrow}}{\underset{\big|}{S}}\diagdown\overset{CH_3}{\underset{CH_3}{C}}$$
$$O=C-N-CH-R'$$

wherein

R is $C_1$–$C_8$ alkyl, $C_3$–$C_8$ cycloalkyl, or $C_2$–$C_8$ alkenyl, optionally substituted with hydroxyl, mercapto, $C_1$–$C_3$ alkoxy, $C_1$–$C_3$ alkylthio, halo, or cyano; hydrogen; carboethoxy;

$$\text{Q}\diagup\!\!\!\diagdown-(CH_2)_m-X-(CH_2)_n-$$

$$\text{Q}\diagup\!\!\!\diagdown-\underset{Y}{\underset{\big|}{CH}}-$$

or $$\text{Q}\diagup\!\!\!\diagdown-\overset{CH_3}{\underset{CH_3}{\underset{\big|}{\overset{\big|}{C}}}}-$$

Q is hydrogen, hydroxyl, mercapto, chloro, bromo, fluoro, $C_1$–$C_3$ alkyl, $C_1$–$C_3$ alkoxy, $C_1$–$C_3$ alkylthio, nitro, or cyano;
X is oxygen, sulfur, or a carbon to carbon bond;
Y is hydroxyl, mercapto, azido, or amino;
m is an integer of 0–2;
n is an integer of 1–2;
R' is —$CH_2OZ$, $$-CH_2O\overset{O}{\overset{\|}{C}}Z$$

$$-\overset{O}{\overset{\|}{C}}-NHZ$$

or $$-\overset{O}{\overset{\|}{C}}-O-R''$$

R'' is hydrogen, $C_1$–$C_4$ alkyl, $C_4$–$C_6$ t-alkyl, $C_5$–$C_8$ t-alkenyl, $C_5$–$C_8$ t-alkynyl, benzyl, methoxybenzyl, nitrobenzyl, benzhydryl, phthalimidomethyl, succinimidomethyl, phenacyl, or trichloroethyl; and
Z is hydrogen; $C_1$–$C_8$ alkyl, $C_3$–$C_8$ cycloalkyl, or $C_2$–$C_8$ alkenyl, optionally substituted with hydroxyl, mercapto, $C_1$–$C_3$ alkoxy, $C_1$–$C_3$ alkylthio, or cyano; or phenyl or phenyl-$C_1$–$C_3$ alkyl, optionally substituted with hydroxyl, mercapto, chloro, fluoro, bromo, $C_1$–$C_3$ alkyl, $C_1$–$C_3$ alkoxy, $C_1$–$C_3$ alkylthio, nitro, or cyano.

It is understood that hydroxyl, mercapto, and amino groups are protected during the reaction, all in accordance with procedures known in the art. For example, hydroxyl and mercapto groups are protected by the formation of an ester or thioester such as the formate, acetate, or trifluoroacetate. Amino groups are protected by substitution by an easily removable group such as triphenylmethyl, t-butyloxycarbonyl, trichloroethoxycarbonyl, benzyloxycarbonyl, lower alkanoyl, benzoyl, or the enamine from methyl acetoacetate. The protection of hydroxyl, mercapto, and amino groups is well known to those skilled in the art. The particular protecting group employed is not important to this invention.

Specific examples of R include benzyl, phenoxymethyl, 2 - phenoxyisopropyl, α - azidobenzyl, benzyloxymethyl, α - (N - benzyloxycarbonylamino) - benzyl, 4 - mercaptobenzyl, methyl, cyclohexyl, methoxyethyl, methylthioethyl, n-hexyl, pentenyl, t-butyl, cyclopentyl, 2-cyanopropyl, α-hydroxybenzyl, m-chlorobenzyl, p-ethoxyphenoxymethyl, p-nitrophenoxyethyl, o-methylbenzyl, and p-hydroxyphenoxymethyl. The first three are preferred groups. Specific examples of R'' include methyl, ethyl, t-butyl, 3-methyl-3-butenyl, 3-methyl-3-butynyl, benzyl, p-methoxybenzyl, p-nitrobenzyl, phenacyl, and trichloroethyl. When R'' is hydrogen, the carboxyl group is esterified by an alkyl group from the trialkylphosphate, so that the product is an ester. The preferred R'' groups are trichloroethyl and p-nitrobenzyl. Examples of Z include hydrogen, methyl, ethyl, hexyl, cyclohexyl, t-butyl, cyclopentyl, methoxyethyl, pentenyl, 3-cyanopentyl, phenyl, benzyl, 2-phenyl-ethyl, m-chlorophenyl, p-ethoxybenzyl, p-nitrophenyl, o-methylbenzyl, and 2-(p-hydroxyphenyl) ethyl.

Typical starting materials for my rearrangement process are the following penicillin sulfoxides:

Penicillin V sulfoxide
Trichloroethyl ester of penicillin V sulfoxide
p-Nitrobenzyl ester of penicillin G sulfoxide
Methyl 6-(m-chlorophenylacetamido)penam-3-carboxylate-1-oxide
3-hydroxymethyl-6-(cyclohexylcarboxamido)penam-1-oxide
3-acetoxymethyl-6-(capramido)penam-1-oxide
3-butoxymethyl-6-(p-nitrophenoxyacetamido)penam-1-oxide
N-methylamide of penicillin V sulfoxide
3-hydroxymethyl-6-(mandelamido)penam-1-oxide
3-benzyloxymethyl-6-acetamidopenam-1-oxide
3-benzoyloxymethyl-6-(phenoxyacetamido)penam-1-oxide.

Those skilled in the penicillin art will recognize that R, R', R'' and Z may have other values equivalent to those named. The essential elements of the starting material are the penam nucleus and the amido group in the 6-position.

The thiazoline azetidinone rearrangement product obtained from my process is one having the formula

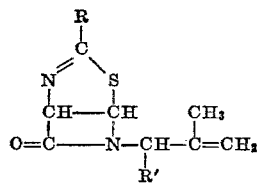

wherein R and R' have the values recited above, and in addition, R may be $C_1$-$C_4$ alkoxy. It is to be understood that when R' is an ester group it may be converted to the free acid.

With one exception to be described below, neither R nor R' is changed during the rearrangement reaction so that both have the same value in the product as they had in the starting penicillin sulfoxide. These products are novel chemical compounds which can be converted into cephalosporins and 2-hydroxymethylpenicillins as will be described in more detail below.

Upon treatment with an oxidizing agent as described hereinbelow the above rearrangement product is converted to a mixture of a desacetoxycephalosporin sulfoxide and a 2-hydroxymethylpenicillin sulfoxide having the following formulas:

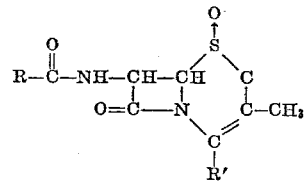

and

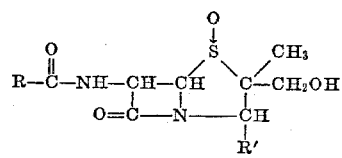

Once again, R and R' remain unchanged and so have the values they had in the original penicillin sulfoxide starting material. Occasionally the ester group and hydroxyl group of the penicillin cyclize to a lactone.

Two types of oxidizing agents may be used in this process. The first type is a mixture of an organic carboxylic peracid and a carboxylic acid having a dissociation constant of at least $10^{-5}$. The second type is a mixture of hydrogen peroxide and an acid having a dissociation constant of at least $10^{-5}$. Organic carboxylic peracids are well known to those skilled in the art and include m-chloroperbenzoic acid, peracetic acid, trifluoroperacetic acid, performic acid, and permaleic acid. The organic carboxylic peracid may be added as such or may be generated in situ by the use of at least an equivalent of hydrogen peroxide and a carboxylic acid. It is often desirable to use a large excess of the carboxylic acid as, for example, when acetic acid is used as the solvent. In carrying out this reaction with carboxylic peracids at least a catalytic amount of a carboxylic acid having a dissociation constant of at least $10^{-5}$ must also be used. The stronger the acid the more effective it is as a catalyst. Catalytic quantities of as little as 1 to 2 percent or less of the acid are sufficient. Acids that exhibit some catalytic activity in this oxidation include acetic acid, formic acid, and trifluoroacetic acid.

The second class of oxidizing agent is a mixture of at least one equivalent of hydrogen peroxide and an acid having a dissociation constant of at least $10^{-5}$. In some ways this overlaps with the in situ generation of a carboxylic peracid but also includes mixtures wherein less than an equivalent amount of the acid are employed. For example, only catalytic amounts of 1 to 2 percent of the acid are sufficient. Larger amounts of the acid may be employed. The stronger the acid the more effective is the mixture. It is not known if the oxidation proceeds through a peracid which is continuously regenerated by the hydrogen peroxide present or whether hydrogen peroxide is the oxidizing agent and the acid is acting as a catalyst for this oxidation. Acids which may be used in this manner with hydrogen peroxide include, for example, acetic acid, perchloric acid and trifluoroacetic acid. The preferred oxidizing agents for this step of the process are performic acid, trifluoroperacetic acid and m-chloroperbenzoic acid in the presence of acetic or trifluoroacetic acid.

This oxidation-rearrangement step is conducted at a temperature within the range of about −20° to +100° C. and preferably within the range of about 0° to 50° C. The reaction is preferably conducted in an inert, organic solvent such as benzene, tetrahydrofuran, acetonitrile, or dimethylformamide. In addition, an excess of an acid such as acetic acid or trifluoroacetic acid may be employed as the solvent. At least one equivalent of oxidizing agent per mole of intermediate rearrangement product should be used and preferably a slight excess of from 10 to 20 percent of the oxidizing agent is employed. Larger excesses may be used but offer no additional beneficial results.

My novel rearrangement process will be illustrated by the following examples.

EXAMPLE 1

A mixture of 4.97 g. of the trichloroethyl ester of penicillin V sulfoxide and 1.86 g. of trimethyl phosphite in 120 ml. of ethyl acetate was heated under reflux for two days. The ethyl acetate was removed in vacuo and the residue was washed with cold Skellysolve B and recrystallized three times from 2B ethanol to yield 1 g. of product which was shown by infrared and nuclear magnetic resonance spectroscopy to have the following structure:

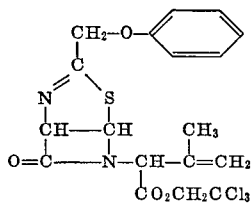

*Analysis.*—Calculated for $C_{18}H_{17}N_2O_4Cl_3S$ (percent): C, 46.61; H, 3.69; N, 6.04. Found (percent): C, 46.85; H, 3.64; N, 6.14.

EXAMPLE 2

Example 1 was repeated using 120 ml. of chloroform instead of ethyl acetate and heating the mixture under reflux for five days. Evaporation of the chloroform left a crystalline material which was recrystallized from ethanol. Thin-layer chromatography showed the product to contain two spots. The crystals and the residue from the evaporation of the ethanol filtrate were combined and chromatographed over silica gel using 3:7 ethyl acetate/benzene as eluent. There was obtained 2.6 g. of a product having a melting point of 142° C. and which was shown by analysis and nuclear magnetic reasonance spectroscopy to be the same as the product from Example 1. In addition 750 mg. of starting material was recovered.

EXAMPLE 3

The procedure of Example 1 was repeated employing tetrahydrofuran as solvent and heating under reflux for four days. Evaporation of the tetrahydrofuran left a white crystalline product which was washed with cold Skellysolve B and recrystallized from ethanol. There was obtained 2.82 g. of product melting at 135°–137° C. and showing only one spot on thin-layer chromatography. This product was confirmed to be identical to the product from Example 1 by elemental analysis and nuclear magnetic resonance spectroscopy.

EXAMPLE 4

A mixture of 10 g. of the trichloroethyl ester of penicillin V sulfoxide and 2 ml. of triethyl phosphite in 200 ml. of benzene was heated under reflux for 24 hours. The solvent was removed under vacuum and the residue was triturated and washed with cold Skellysolve B, then recrystallized from ether as needles melting at 133° C. The yield was 6 g. Nuclear magnetic reasonance spectroscopy confirmed the product to be the same as that obtained from Example 1.

EXAMPLE 5

A mixture of 4.96 g. of the trichloroethyl ester of penicillin V sulfoxide and 2.67 g. of triphenyl phosphine in benzene was heated under reflux for 48 hours. The reaction mixture was cooled, methyl iodide was added, and the solution allowed to stand overnight. The mixture was filtered and the filtrate was evaporated and the residue recrystallized from methanol to yield 1 g. of crystalline product which was shown by nuclear magnetic resonance spectroscopy to be the same as the product from Example 1.

EXAMPLE 6

A mixture of 1.36 g. of the trichloroethyl ester of penicillin G sulfoxide and 1 ml. of trimethyl phosphite in 50 ml. of benzene was heated under reflux for 36 hours. The solution was washed well with water, the solvent was removed under vaccum leaving a white solid which was recrystallized from methanol to give 985 mg. of white needles melting at 145° C. This product was confirmed by nuclear magnetic resonance spectroscopy to have the following structure.

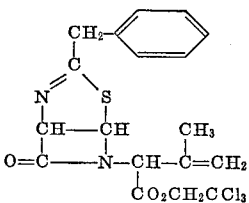

*Analysis.*—Calculated for $C_{18}H_{17}N_2O_3Cl_3S$ (percent): C, 48.27; H, 3.83; N, 6.25; Cl, 23.75; S, 7.16. Found (percent): C, 48.51; H, 3.99; N, 6.48; Cl, 23.54; S, 7.30.

EXAMPLE 7

A mixture of 31 g. of the methyl ester of penicillin V sulfoxide and 20 ml. of triethyl phosphite in 600 ml. of benzene was heated under reflux using a water separator for 24 hours. Removal of the solvent under vacuum left a yellow oil which was dissolved in methanol and treated with charcoal. Evaporation of the methanol left a pale yellow oil which was shown by nuclear magnetic reasonance spectroscopy to be the methyl ester corresponding to the product of Example 1, containing some triethyl phosphate.

EXAMPLE 8

A mixture of 100 g. of the p-nitrobenzyl ester of penicillin V sulfoxide and 50 ml. of trimethyl phosphite in 1 l. of ethyl acetate and 40 ml. of tetrahydrofuran was heated under reflux for two days. The solvent was removed under vacuum, the residue triturated with benzene and the mixture filtered to yield 20 g. of starting material. The benzene was evaporated under vacuum and the residue was crystallized from methanol to yield 50 g. of product which was confirmed by spectral analysis to be the p-nitrobenzyl ester corresponding to the product of Example 1.

EXAMPLE 9

A solution of 270 mg. of 3-acetoxymethyl-6-phenoxyacetamidopenam sulfoxide and 0.5 ml. of trimethyl phosphite in 50 ml. of benzene was heated under reflux for 48 hours. The reaction mixture was washed with water and the solvent was evaporated under vacuum to yield a yellow oil. Thin-layer chromatography showed one main spot. The product was purified by chromatography over silica in a benzene solvent, eluting with 3:7 ethyl acetate/benzene. There was obtained 121 mg. of a colorless oil which was shown by nuclear magnetic resonance spectroscopy to be the acetoxymethyl derivative corresponding to the ester obtained in Example 1.

EXAMPLE 10

A solution of 420 mg. of 3-hydroxymethyl-6-phenoxyacetamidopenam sulfoxide and 0.5 ml. of trimethyl phosphite in 50 ml. of benzene was heated under reflux for 24 hours. The reaction mixture was washed with water, dried, and the solvent removed under vacuum to yield 400 mg. of a colorless oil. This product was shown by nuclear magnetic resonance spectroscopy to be the hydroxymethyl derivative corresponding to the ester of Example 1.

EXAMPLE 11

A solution of 137 mg. of the N-t-butylamide of penicillin V sulfoxide and 0.5 ml. of trimethyl phosphite in 50 ml. of dioxane was heated under reflux for 25 hours. The dioxane was evaporated under vacuum, the residue was dissolved in ethyl acetate and the solution was washed with water, dried, and the ethyl acetate removed under vacuum to yield 170 mg. of a colorless oil. Nuclear magnetic resonance spectroscopy showed this product to be the butylamide corresponding to the ester product of Example 1.

EXAMPLE 12

A solution of 101 g. of the p-methoxybenzyl ester of pencillin V sulfoxide and 50 ml. of trimethyl phosphite in 2000 ml. of benzene was heated under reflux for 40 hours using a Dean-Stark trap. Additional trimethyl phosphite was added during this period to carry the reaction to completion. The benzene was evaporated yielding a yellowish solid which was recrystallized from methanol to give white crystals melting at 96° to 97° C. This product was shown by nuclear magnetic resonance spectroscopy to be the p-methoxybenzyl ester corresponding to the trichloroethyl ester of Example 1.

EXAMPLE 13

A solution of 33 g. of trichloroethyl 6-(α,α-dimethylphenoxyacetamido)penam-3-carboxylate sulfoxide and 5 ml. of trimethyl phosphite in 250 ml. of benzene was heated under reflux until thin-layer chromatography showed most of the starting material had reacted (about two days). The benzene solution was washed several times with water, dried, and the benzene evaporated. The residue was crystallized from methanol to give 5.5 g. of product melting at 145° C. This product was shown by nuclear magnetic resonance spectroscopy to have the following structure.

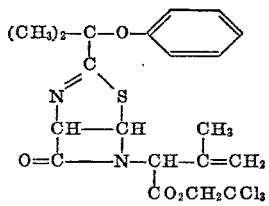

*Analysis.*—Calculated for $C_{20}H_{21}N_2O_4Cl_3S$ (percent): C, 48.83; H, 4.30; N, 5.70; Cl, 21.62; S, 6.52. Found (percent): C, 49.05; H, 4.59; N, 5.94; Cl, 21.82; S, 6.36.

EXAMPLE 14

To a warm solution of 2.48 g. (0.005 mole) of penicillin V sulfoxide trichloroethyl ester in 10 ml. of dry benzene were added 75 ml. of carbon tetrachloride and 744 mg. of trimethyl phosphite. This mixture was heated under reflux for 22 hours. Thin-layer chromatography showed the product to be one spot material with no starting material present. The solvents were removed in vacuo and the residue recrystallized from ethanol. There was obtained 2.1 g. of white, feathery crystals melting at 133° C. Elemental analysis and nuclear magnetic resonance spectroscopy confirmed the product to be identical to the product from Example 1.

EXAMPLE 15

To a suspension of 5.6 g. of 6-aminopenicillanic acid (6-APA) in 150 ml. of methylene chloride was added 3.4 ml. of trimethylamine. The solution was stirred at 0° C. for 45 minutes and 2 ml. of acetic formic anhydride was added. The solution was stirred for 1 hour at 0° C. and another hour at room temperature. Filtration of the solution removed 1.58 g. of unreacted 6-APA. The filtrate was concentrated in vacuo and the residue dissolved in ethyl acetate. Water was added and the pH adjusted to 2.5 with dilute hydrochloric acid. The ethyl acetate solution was removed and washed with sodium bicarbonate solution. The sodium bicarbonate solution was acidified to pH 3 and extracted with ethyl acetate. The ethyl acetate extract was dried over magnesium sulfate and the solvent removed in vacuo to give a buff foam. NMR and IR identified the product as N-formylpenicillin. To a suspension of 1 g. of N-formylpenicillin in ether was added an ethereal solution of diazomethane until a residual yellow color remained. The solvent was removed in vacuo, the residue dissolved in chloroform, and treated with 1 equivalent of m-chloroperbenzoic acid at room temperature for 1 hour. The solution was washed with sodium bisulfite solution and then sodium bicarbonate solution, dried, and the solvent removed in vacuo to give 135 mg. of a foam which was shown by NMR to be the methyl ester of N-formylpenicillin sulfoxide. A solution of 130 mg. of the sulfoxide in 30 ml. of dry benzene containing 3 drops of trimethyl phosphite was heated under reflux for 24 hours. The solution was washed well with water and the solvent removed in vacuo to give 46 mg. of product as a pale yellow oil. NMR showed it to be in the thiazoline having the structure.

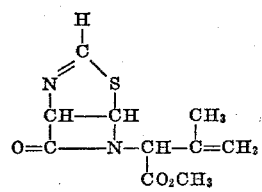

EXAMPLE 16

A suspension of 10.8 g. of 6-APA in 400 ml. of methylene chloride containing 10.1 g. of triethylamine was stirred at room temperature for 3 hours. Filtration removed 2.5 g. of undissolved 6-APA. The filtrate was cooled to −78° C. and a solution of 6.8 g. of ethyloxalyl chloride in methylene chloride was added dropwise. After addition was complete the temperture was maintained at −40° C. for 2 hours and at 0° C. for 16 hours. The solution was evaporated in vacuo and the residue dissolved in equal volumes of ethyl acetate and water. The pH was adjusted to 2.5 and the ethyl acetate layer removed, washed several times with water, dried over magnesium sulfate, and the solvent removed in vacuo to leave 7.5 g. of N-ethyloxalylpenicillin. To a solution of 798 mg. of N-ethyloxalylpenicillin in 20 ml. of ether was added an ethereal solution of diazomethane until a yellow color remained. The solution was then stirred at room temperature for ½ hour and the solvent removed in vacuo to leave 780 mg. of a yellow foam which was shown by NMR to be the methyl ester. This ester was dissolved in 100 ml. of methylene chloride and 200 mg. of m-chloroperbenzoic acid was added. The solution was stirred at room temperature for ½ hour and another 50 mg. of the peracid was added. After an additional ½ hour the solution was washed with sodium bisulfate solution followed by sodium bicarbonate solution, dried, and evaporated in vacuo to leave 700 mg. of white foam shown by NMR to be the methyl ester of N-ethyloxalylpenicillin sulfoxide. A solution of 100 mg. of the sulfoxide and ½ ml. of trimethylphosphite in 100 ml. of benzene was heated under reflux for 20 hours. The solution was washed well with water, dried over magnesium sulfate, and evaporated in vacuo to leave 89 mg. of white crystals shown by NMR to be the thiazoline having the formula

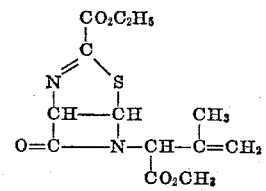

EXAMPLE 17

A solution of 1 g. of the p-nitrobenzyl ester of chloroacetylpenicillin sulfoxide and 1 ml. of trimethylphosphite in 50 ml. of dioxane was heated under reflux for 16 hours. The solvent was removed in vacuo and the residue dissolved in ethyl acetate. The ethyl acetate solution was washed well with water and the ethyl acetate removed in vacuo to give 850 mg. of a yellow oil identified as the thiazoline having the structure

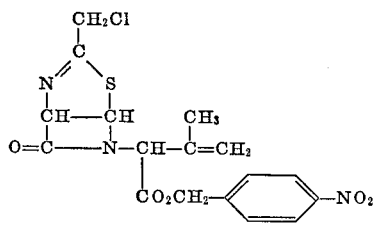

EXAMPLE 18

A solution of 3.66 g. of penicillin V sulfoxide in 50 ml. of trimethyl phosphite was heated on a steam bath for 12 hours. The mixture was evaporated in vacuo, the residue dissolved in ethyl acetate, the ethyl acetate washed well with water, dried, and the solvent evaporated in vacuo to leave 2.65 g. of a colorless, neutral oil. NMR showed the product to be the thiazoline having the structure

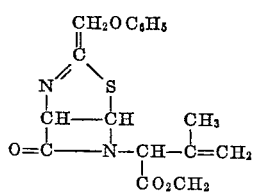

Thus, the free carboxyl group was converted to the methyl ester by the trimethyl phosphite.

The above examples illustrate my rearrangement process using different phosphorus reagents with a number of penicillins bearing different substituents in the 3- and 6-positions. These examples demonstrate that the process is a general one and is independent of the substituents on the penicillin nucleus. Those skilled in the penicillin art will recognize that other penicillins or penicillin derivatives that contain the penam nucleus may be employed in the process in an equivalent manner.

As noted earlier, I have discovered one case in which R in the starting penicillin sulfoxide does not survive the rearrangement reaction so that a different group is present in the thiazoline azetidinone. Thus, when R in the penicillin sulfoxide is

two products are recovered from the reaction. They have the following formulas:

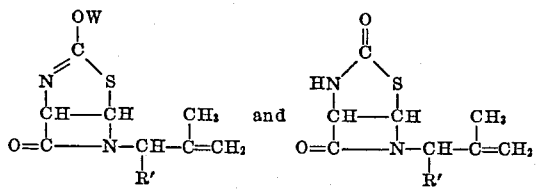

wherein W is an alkyl group from the trialkyl phosphite. Thus, R in the generic formula of the thiazoline azetidinone may be $C_1$–$C_4$ alkoxy. The second product does not fit the generic formula. The preparation of these two compounds will be illustrated by the following example.

EXAMPLE 19

A suspension of 20 g. of 6-APA in 100 ml. of methylene chloride containing 20 ml. of triethylamine was stirred at room temperature for ½ hour, filtered to remove undissolved 6-APA, and 18 g. of p-toluenesulfonylisocyanate was added slowly at 0° C. The solution was stirred at 10° C. for 1 hour, washed with dilute hydrochloric acid, dried over magnesium sulfate, and evaporated in vacuo to leave 40 g. of tosylureidopenicillin as a white foam. A solution of 20 g. of this foam in 200 ml. of methylene chloride was treated with an ethereal solution of diazomethane until a yellow color persisted. The solvent was removed in vacuo to leave a white foam which was dissolved in 200 ml. of chloroform and 10.5 g. of m.-chloroperbenzoic acid was added. The solution was stirred at room temperature for 1 hour then washed with sodium bisulfite solution and sodium bicarbonate solution. The chloroform solution was dried over magnesium sulfate and the solvent removed in vacuo to give a white foam which was purified by chromatography on silica gel in benzene-ethyl acetate to gixe 10 g. of a product shown by NMR to be the methyl ester of N-methyl-p-toluenesulfonyl-ureidopenicillin sulfoxide. A solution of 1 g. of the sulfoxide and 1 ml. of trimethyl phosphite in 50 ml. of benzene was heated under reflux for 16 hours. The solution was washed well with water, dried over magnesium sulfate, and the solvent removed in vacuo to give a white foam. This form was shown to be a mixture of the two compounds shown above wherein W is methyl and R' is methoxycarbonyl. There was also some N-methyltoluenesulfonamide present. Extensive chromatography gave the 2-methoxythiazoline and the thiazolidinone as pure oils.

The conversion of the intermediate rearrangement products obtained in the above examples to desacetoxycephalosporins and hydroxymethylpenicillins will be illustrated by the following examples.

EXAMPLE 20

A mixture of 9.26 g. of the product from Example 1, 5 g. of m-chloroperbenzoic acid and 20 ml. of trifluoroacetic acid in 500 ml. of benzene was stirred at 10° C. until a negative starch-iodide test was obtained (about one and one-half hours), then an additional hour at room temperature. The solution was washed twice with sodium carbonate solution, dried over magnesium sulfate and the solvent was removed in vacuo to leave a yellow residue. The addition of ether of this residue resulted in the precipitation of 2.2 g. of unreacted starting material. Evaporation of the ether solution again gave a yellow residue. The infrared spectrum of this residue showed strong adsorption at 1800 cm.$^{-1}$. The product was chromatographed over silica eluting with ethyl acetate/benzene. The first 500 ml. of eluate was discarded and the following fractions were then collected.

| Fraction A | 2.5 g. |
|---|---|
| Fraction B | 1.56 g. |
| Fraction C | 0.374 g. |
| Fraction D | 0.83 g. |
| Fraction E | 0.45 g. |
| Fraction F | 1.42 g. (from 1 l. of ethyl acetate). |
| Fraction G | 1.50 g. (from 1 l. of acetone). |

Fractions C, D, E, F and G were recombined and rechromatographed over silica eluting with 25 percent actone in chloroform and gradually increasing to 33 percent acetone. The following fractions were collected.

| | Mg. |
|---|---|
| Fraction A | 282 |
| Fraction B | 342 |
| Fraction C | 220 |
| Fraction D | 528 |
| Fraction E | 117 |
| Fraction F | 434 |
| Fraction G | 1130 |
| Fraction H | 488 |
| Fraction I | 117 |

Fractions H and G were crystallized from methanol to yield a crystalline compound containing no chlorine nor methylene group of the trichloroethyl group. By means of mass spectrometry and nuclear magnetic resonance spectrometry the structure of this product was determined to be the following.

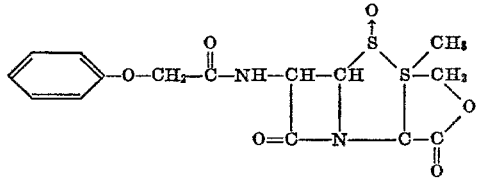

Fractions B, C, D, and E were recombined and rechromatographed on silica eluting with 2:1 benzene/ethyl acetate. In this manner there were obtained 430 mg. of Compound A and 238 mg. of Compound B. Nuclear magnetic resonance showed Compound A to be the desired trichloroethyl ester of 2 - hydroxymethylpenicillin V sulfoxide while Compound B was shown to be the desired trichloroethyl ester of desacetoxycephalosporin V sulfoxide.

EXAMPLE 21

A solution of 4.67 g. of the p-nitrobenzyl ester product prepared as in Example 8, 4.35 g. of m-chloroperbenzoic acid and 6 drops of trifluoroacetic acid in dimethylformamide was kept at 0° C. for approximately 48 hours. The solvent was removed in vacuo, the residue was dissolved in ethyl acetate, the ethyl acetate solution washed with sodium carbonate solution, dried over magnesium sulfate, and evaporated to give 3.6 g. of product. This product was chromatographed over silica eluting with 3:7 ethyl acetate/benzene. In this manner there were obtained 125 mg. of the p-nitrobenzyl ester of desacetoxycephalosporin V sulfoxide and 200 mg. of the p-nitrobenzyl ester of 2-hydroxymethylpenicillin V sulfoxide.

EXAMPLE 22

A solution of 4.63 g. of the trichloroethyl ester obtained as in Example 1, 4.35 g. of m-chloroperbenzoic acid and 3 drops of trifluoroacetic acid in 200 ml. of tetrahydrofuran was stirred at 0° C. until a negative starch-iodide test was obtained (about 4 hours). The solvent was removed in vacuo, the residue was dissolved in ethyl acetate, the ethyl acetate solution washed with sodium carbonate solution, dried over magnesium sulfate, and evaporated to leave a brown oil. This oil was chromatographed over silica, eluting first with 1 l. of benzene then with two 500 ml. portions of 3:7 ethyl acetate/benzene, two 500 ml. portions of 1:1 ethyl acetate/benzene, two 500 ml. portions of ethyl acetate and one 500 ml. portions of acetone. The evaporation of the respective eluates resulted in the following fractions.

|  | Mg. |
|---|---|
| Fraction 1 | 1170 |
| Fraction 2 | 550 |
| Fraction 3 | 340 |
| Fraction 4 | 180 |
| Fraction 5 | 200 |
| Fraction 6 | 109 |
| Fraction 7 | 230 |

Fraction 3 was shown by nuclear magnetic resonance and mass spectrometry to be the trichloroethyl ester of 2-hydroxymethylpenicillin V sulfoxide. Fractions 4 through 7 were shown to be the trichloroethyl ester of desacetoxycephalosporin V sulfoxide, both the α- and β-isomers being obtained. Recrystallization of these fractions resulted in a product having a melting point of 185 to 186° C.

It can be seen that treatment of the thiazoline product with a peracid results in the formation of a hydroxymethylpenicillin sulfoxide or a desacetoxycephalosporin sulfoxide. In addition, the corresponding sulfides and sulfones are sometimes formed. The hydroxymethylpenicillin sometimes is converted to the corresponding lactone, while occasionally the original penicillin is also formed in small amounts. There is thus offered a novel method for the preparation of desacetoxycephalosporins and functionalized methylpenicillins.

Treatment of the thiazoline azetidinone with a base under mild conditions results in the isomerization of the side chain double bond to give a product having the formula

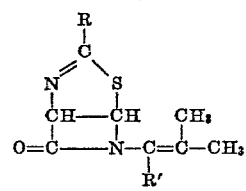

wherein R and R' have the values assigned above. This shift of the double bond occurs in the presence of a base having a dissociation constant greater than about $10^{-10}$ at a temperature within the range of 0°–50° C., and preferably within the range of 20°–30° C., for a time of not more than 30 minutes. If the reaction is allowed to proceed longer than about 30 minutes further reaction occurs leading to by-products. The base may serve as the solvent for this reaction or an inert solvent such as methanol, ethanol, tetrahydrofuran, dioxane, or dimethylformamide can be used.

The base to be used in the isomerization is an organic or inorganic base having a dissociation constant greater than about $10^{-10}$. Examples of such bases include sodium hydroxide, sodium carbonate, sodium methoxide, potassium methoxide, trimethylamine, N,N-dimethylaniline, pyridine, diethylamine, methylamine, piperidine, and ammonia. Approximately one equivalent of base per mole of starting thiazoline azetidinone should be used.

The isomerization reaction will be further illustrated by the following example.

EXAMPLE 23

A solution of 150 mg. of the product from Example 4 in 20 ml. of triethylamine was allowed to stand at room temperature for 16 hours. The triethylamine was removed in vacuo leaving 145 mg. of an oil. Thin-layer chromatography showed one spot running slightly ahead of starting material. The infrared spectrum showed the presence of the β-lactam and ester groups, while the nuclear magnetic resonance spectrum showed two methyl groups attached to a double bond, thus confirming the presence of the product having the formula

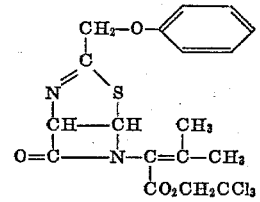

The ease with which this isomerization takes place is illustrated by the following example in which the original rearrangement reaction was conducted under apparently mildly basic conditions to give the same product as was obtained in Example 18 rather than the expected isomer having the double bond in a terminal position.

EXAMPLE 24

A mixture of 4.97 g. of penicillin V sulfoxide trichloroethyl ester and 1.86 g. of trimethyl phosphite in 25:75 formamide/benzene was heated under reflux over the weekend. Evaporation of the solvents in vacuo left a dark oil which was taken up in ethyl acetate. Thin-layer chromatography showed very little starting material. The ethyl acetate solution was washed several times with water, the ethyl acetate was evaporated, and the residue was chromatographed over silica gel using 3:7 ethyl acetate/ benzene as eluent. There was obtained 3.8 g. of an oil which was shown by its nuclear magnetic resonance spectrum to be the same as the product from Example 18. There was also obtained 846 mg. of starting material. It is believed that this isomer was obtained because of the presence of some amine in the formamide used as solvent.

These thiazoline azetidinones having the side-chain double bond in the α,β-position are useful in the treatment of plant diseases. For example, the ester from Example 23 and the corresponding acid are extremely active against Fusarium Root Rot. This activity was detected by applying the compound at a broadcast rate of 40 pounds per acre to Fusarium-infested soil and then planted Bountiful variety bean seeds in the soil. After 14 days the bean plants were found to be free of the disease.

In addition, these compounds are useful as antibiotics. The ester from Example 23 is active against *Botrytis cinerea* at a concentration of 100 mcg./ml. as determined by an agar dilution test method described by Steers and Foltz in Antibiotics and Chemotherapy 9, p. 307 (1959).

I claim:

1. A method for the preparation of a penicillin rearrangement product having the formula

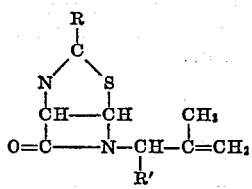

which comprises treating a penicillin sulfoxide having the formula

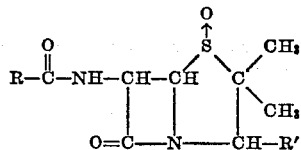

with at least one equivalent of triphenyl phosphine or a trialkyl phosphite wherein the alkyl groups contain from 1 to 4 carbon atoms at a temperature within the range of 40° to 125° C., wherein in the formulas R is $C_1$–$C_8$ alkyl, $C_3$–$C_8$ cycloalkyl, or $C_2$–$C_8$ alkenyl, optionally substituted with hydroxy, mercapto, $C_1$–$C_3$ alkoxy, $C_1$–$C_3$ alkylthio, halo, or cyano; hydrogen; carboethoxy;

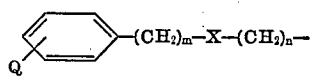

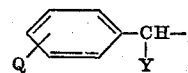

or

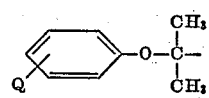

Q is hydrogen, hydroxyl, mercapto, chloro, bromo, fluoro, $C_1$–$C_3$ alkyl, $C_1$–$C_3$ alkoxy, $C_1$–$C_3$ alkylthio, nitro, or cyano;

X is oxygen, sulfur, or a carbon to carbon bond;

Y is hydroxyl, mercapto, azido, or amino;

m is an integer of 0–2;

n is an integer of 1–2;

R' is —CH$_2$OZ,

—CH$_2$OĊZ (with O double-bonded)

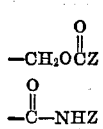

or

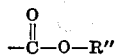

R'' is hydrogen, $C_1$–$C_4$ alkyl, $C_4$–$C_6$ t-alkyl, $C_5$–$C_8$ t-alkenyl, $C_5$–$C_8$ t-alkynyl, benzyl, methoxybenzyl, nitrobenzyl, benzhydryl, phthalimidomethyl, succinimidomethyl, phenacyl, or trichloroethyl; and Z is hydrogen; $C_1$–$C_8$ alkyl, $C_3$–$C_8$ cycloalkyl, or $C_2$–$C_8$ alkenyl, optionally substituted with hydroxyl, mercapto, $C_1$–$C_3$ alkoxy, $C_1$–$C_3$ alkylthio, or cyano; or phenyl or phenyl-$C_1$–$C_3$ alkyl, optionally substituted with hydroxy, mercapto, chloro, fluoro, bromo, $C_1$–$C_3$ alkyl, $C_1$–$C_3$ alkoxy, $C_1$–$C_3$ alkylthio, nitro, or cyano.

2. A method as in claim 1 wherein the penicillin sulfoxide is treated with trimethyl phosphite at a temperature within the range of 50° to 110° C.

3. A method as in claim 1 wherein the penicillin sulfoxide is treated with triethyl phosphite at a temperature within the range of 50° to 110° C.

4. A compound having the formula

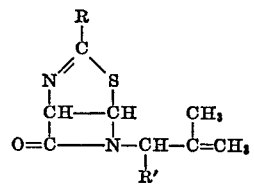

wherein

R is $C_1$–$C_8$ alkyl, $C_3$–$C_8$ cycloalkyl, or $C_2$–$C_8$ alkenyl, optionally substituted with hydroxyl, mercapto, $C_1$–$C_3$ alkoxy, $C_1$–$C_3$ alkylthio, halo, or cyano; hydrogen; carboethoxy; $C_1$–$C_4$ alkoxy;

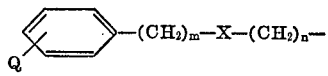

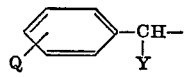

or

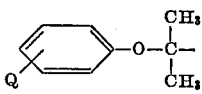

Q is hydrogen, hydroxyl, mercapto, chloro, bromo, fluoro, $C_1$–$C_3$ alkyl, $C_1$–$C_3$ alkoxy, $C_1$–$C_3$ alkylthio, nitro, or cyano;

X is oxygen, sulfur, or a carbon to carbon bond;

Y is hydroxyl, mercapto, azido, or amino;

m is an integer of 0–2;

n is an integer of 1–2;

R' is —CH$_2$OZ,

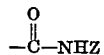

or

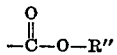

R'' is hydrogen, $C_1$–$C_4$ alkyl, $C_4$$C_6$ t-alkyl, $C_5$–$C_8$ t-alkenyl, $C_5$–$C_8$ t-alkenyl, benzyl, methoxybenzyl, nitrobenzyl, benzhydryl, phthalimidomethyl, succinimidomethyl, phenacyl, or trichloroethyl; and Z is hydrogen; $C_1$–$C_8$ alkyl, $C_3$–$C_8$ cycloalkyl, or $C_2$–$C_8$ alkenyl, optionally substituted with hydroxyl mercapto, $C_1$-$C_3$ alkoxy, $C_1$-$C_3$ alkylthio, or cyano; or phenyl or phenyl-$C_1$-$C_3$ alkyl, optionally substituted with hydroxyl, mercapto, chloro, fluoro, fluoro, bromo, $C_1$-$C_3$ alkyl, $C_1$-$C_3$ alkoxy, $C_1$-$C_3$ alkylthio, nitro, or cyano.

5. A compound as in claim 4 wherein R is phenoxymethyl and R' is $$-\overset{O}{\underset{\|}{C}}-O-R''$$

6. A compound as in claim 5 wherein R" is trichloroethyl.

7. A compound as in claim 5 wherein R" is p-methoxybenzyl.

8. A compound as in claim 5 wherein R" is p-nitrobenzyl.

9. A compound as in claim 4 wherein R is benzyl and R' is $$-\overset{O}{\underset{\|}{C}}-O-R''$$

10. A compound as in claim 9 wherein R" is trichloroethyl.

11. A compound as in claim 9 wherein R" is p-methoxy benzyl.

12. A compound as in claim 9 wherein R" is a-nitrobenzyl.

13. A compound as in claim 4 wherein R is 2-phenoxyisopropyl and R' is $$-\overset{O}{\underset{\|}{C}}-O-R''$$

14. A compound as in claim 13 wherein R" is trichloroethyl.

15. A compound as in claim 13 wherein R" is p-methoxybenzyl.

16. A compound as in claim 13 wherein R" is p-nitrobenzyl.

17. A compound having the formula wherein

R is $C_1$-$C_8$ alkyl, $C_3$-$C_8$ cycloalkyl, or $C_2$-$C_8$ alkenyl, optionally substituted with hydroxyl, mercapto, $C_1$-$C_3$ alkoxy, $C_1$-$C_3$ alkylthio, halo, or cyano; hydrogen; carboethoxy, $C_1$-$C_4$ alkoxy;

Q is hydrogen, hydroxyl, mercapto, chloro, bromo, fluoro, $C_1$-$C_3$ alkyl, $C_1$-$C_3$ alkoxy, $C_1$-$C_3$ alkylthio, nitro, or cyano;

X is oxygen, sulfur, or a carbon to carbon bond;

Y is hydroxyl, mercapto, azido, or amino;

m is an integer of 0-2;

n is an integer of 1-2;

R' is —$CH_2OZ$, $$-CH_2O\overset{O}{\underset{\|}{C}}Z$$

$$-\overset{O}{\underset{\|}{C}}-NHZ$$

or $$-\overset{O}{\underset{\|}{C}}-O-R'''$$

R" is hydrogen, $C_1$-$C_4$ alkyl, $C_4$-$C_6$ t-alkyl, $C_5$-$C_8$ t-alkenyl, $C_5$-$C_8$ t-alkynyl, benzyl, methoxybenzyl, nitrobenzyl, benzhydryl, phthalimidomethyl, succinimidomethyl, phenacyl, or trichloroethyl, and Z is hydrogen; $C_1$-$C_8$ alkyl, $C_3$-$C_8$ cycloalkyl, or $C_2$-$C_8$ alkenyl, optionally substituted with hydroxyl, mercapto, $C_1$-$C_3$ alkoxy, $C_1$-$C_3$ alkylthio, or cyano; or phenyl or phenyl-$C_1$-$C_3$ alkyl, optionally substituted with hydroxyl, mercapto, chloro, fluoro, bromo, $C_1$-$C_3$ alkyl, $C_1$-$C_3$ alkoxy, $C_1$-$C_3$ alkylthio, nitro, or cyano.

18. A method for the conversion of a thiazoline azetidinone having the formula to a desacetoxycephalosporin sulfoxide and a 2-hydroxymethylpenicillin sulfoxide having the formulas which comprises treating the thiazoline with at least one equivalent of a carboxylic peracid containing at least a catalytic amount of a carboxylic acid having a dissociation constant of at least $10^{-5}$ or a mixture of hydrogen peroxide and an acid having a dissociation constant of at least $10^{-5}$ at a temperature within the range of $-20°$ C., wherein in the formulas R is $C_1$-$C_8$ alkyl, $C_3$-$C_8$ cycloalkyl, or $C_2$-$C_8$ alkenyl, optionally substituted with hydroxyl, mercapto, $C_1$-$C_3$ alkoxy, $C_1$-$C_3$ alkylthio, halo, or cyano; hydrogen; carboethoxy; $C_1$-$C_4$ alkoxy;

Q is hydrogen, hydroxyl, mercapto, chloro, bromo, fluoro, $C_1$–$C_3$ alkyl, $C_1$–$C_3$ alkoxy, $C_1$–$C_3$ alkylthio, nitro, or cyano;
X is oxygen, sulfur, or a carbon to carbon bond;
Y is hydroxyl, mercapto, azido, or amino;
$m$ is an integer of 0–2;
$n$ is an integer of 1–2;
R' is —$CH_2OZ$,

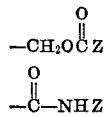

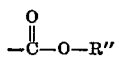

or $$-\overset{O}{\underset{\|}{C}}-O-R''$$

R'' is hydrogen, $C_1$–$C_4$ alkyl, $C_4$–$C_6$ t-alkyl, $C_5$–$C_8$ t-alkenyl, $C_5$–$C_8$ t-alkynyl, benzyl, methoxybenzyl, nitrobenzyl, benzhydryl, phthalimidomethyl, succinimidomethyl, phenacyl, or trichloroethyl; and Z is hydrogen; $C_1$–$C_8$ alkyl, $C_3$–$C_8$ cycloalkyl, or $C_2$–$C_8$ alkenyl, optionally substituted with hydroxyl, mercapto, $C_1$–$C_3$ alkoxy, $C_1$–$C_3$ alkylthio, or cyano; or phenyl or phenyl-$C_1$–$C_3$ alkyl, optionally substituted with hydroxyl, mercapto, chloro, fluoro, bromo, $C_1$–$C_3$ alkyl, $C_1$–$C_3$ alkoxy, $C_1$–$C_3$ alkylthio, nitro, or cyano.

19. A method as in claim 18 wherein the thiazoline azetidinone is treated with at least one equivalent of m-chloroperbenzoic acid at a temperature within the range of 0° to 50° C.

20. A method as in claim 18 wherein the thiazoline azetidinone is treated with at least one equivalent of trifluoroperactic acid at a temperature within the range of 0° to 50° C.

21. A method as in claim 18 wherein the thiazoline azetidinone is treated with at least one equivalent of performic acid at a temperature within the range of 0° to 50° C.

22. A compound having the formula

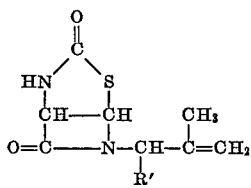

wherein,
R' is —$CH_2OZ$,

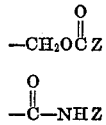

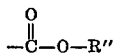

or $$-\overset{O}{\underset{\|}{C}}-O-R''$$

R'' is hydrogen, $C_1$–$C_4$ alkyl, $C_4$–$C_6$ t-alkyl, $C_5$–$C_8$ t-alkenyl, $C_5$–$C_8$ t-alkynyl, benzyl, methoxybenzyl, nitrobenzyl, benzhydryl, phthalimidomethyl, succinimidomethyl, phenacyl, or trichloroethyl; and Z is hydrogen; $C_1$–$C_8$ alkyl, $C_3$–$C_8$ cycloalkyl, or $C_2$–$C_8$ alkenyl, optionally substituted with hydroxyl, mercapto, $C_1$–$C_3$ alkoxy, $C_1$–$C_3$ alkylthio, or cyano; or phenyl or phenyl-$C_1$–$C_3$ alkyl, optionally substituted with hydroxyl, mercapto, chloro, fluoro, bromo, $C_1$–$C_3$ alkyl, $C_1$–$C_3$ alkoxy, $C_1$–$C_3$ alkylthio, nitro, or cyano.

References Cited
UNITED STATES PATENTS
3,422,103   1/1969   Wall et al. _____ 260—243 C NICHOLAS S. RIZZO, Primary Examiner U.S. Cl. X.R.
260—243 C, 306.7; 424—270